United States Patent [19]

Renaud et al.

[11] Patent Number: 4,601,379
[45] Date of Patent: Jul. 22, 1986

[54] FRICTION CLUTCH

[75] Inventors: Pierre Renaud, Le Plessis-Trevise; Philippe Lassiaz, Boulogne, both of France

[73] Assignee: Valeo, Paris, France

[21] Appl. No.: 520,709

[22] Filed: Aug. 5, 1983

[30] Foreign Application Priority Data

Aug. 6, 1982 [FR] France .................. 82 13794

[51] Int. Cl.$^4$ .............................. F16D 13/44
[52] U.S. Cl. ........................ 192/89 B; 192/98
[58] Field of Search ............. 192/89 B, 98, 109 R, 192/110 R

[56] References Cited

U.S. PATENT DOCUMENTS

| 2,356,310 | 8/1944 | Gass | 192/110 R |
| 2,630,897 | 3/1953 | Porter | 192/110 R |
| 3,235,049 | 2/1966 | Hufstader | 192/89 B |
| 3,389,768 | 6/1968 | Cook | 192/89 B |
| 3,595,355 | 7/1971 | Maucher et al. | 192/89 B |
| 3,913,714 | 10/1975 | Camp | 192/98 |
| 3,963,105 | 6/1976 | Ernst et al. | 192/89 B |
| 3,973,659 | 8/1976 | Ernst et al. | 192/89 B |
| 4,084,674 | 4/1978 | de Gennes | 192/89 B |

FOREIGN PATENT DOCUMENTS

| 1814172 | 12/1977 | Fed. Rep. of Germany . |
| 1513988 | 2/1968 | France . |
| 2131731 | 11/1972 | France . |
| 2215112 | 8/1974 | France . |
| 2230896 | 12/1974 | France . |
| 2304826 | 10/1976 | France . |
| 2487025 | 1/1982 | France . |
| 1435908 | 5/1976 | United Kingdom ............ 192/89 B |

Primary Examiner—Ronald C. Capossela
Attorney, Agent, or Firm—Charles E. Brown; Charles A. Brown

[57] ABSTRACT

A friction clutch, particularly suitable for automotive vehicles, comprises a clutch release bearing disposed in axial face-to-face relationship with a diaphragm spring. The spring is mounted inside a clutch cover assembly and has a plurality of centripetal radial fingers around a central hole. The release bearing is adapted to act in traction on these fingers by means of a transverse annular flange disposed inside the cover assembly. The fingers of the diaphragm spring are formed so as to provide a penetration passage through the diaphragm spring for the transverse annular flange, along a penetration direction which is at an acute angle to the median plane of the fingers of the diaphragm spring. A pull type release bearing is obtained by adding a bush forming the transverse annular flange to the drive member of a push type release bearing.

16 Claims, 7 Drawing Figures

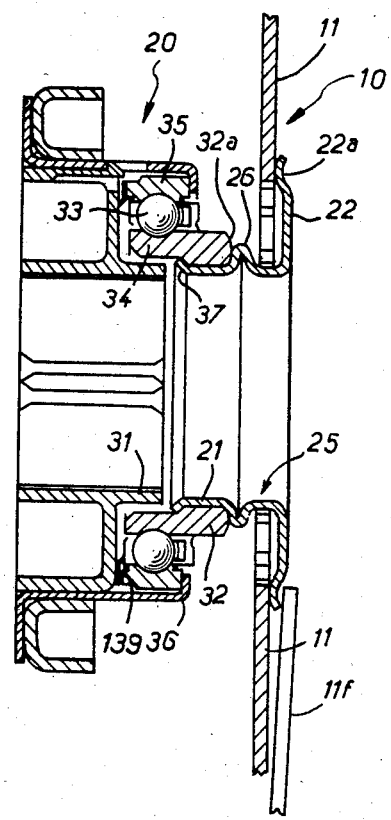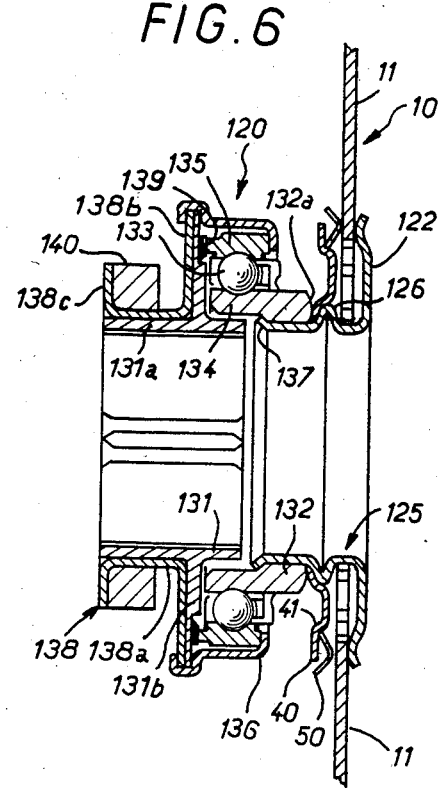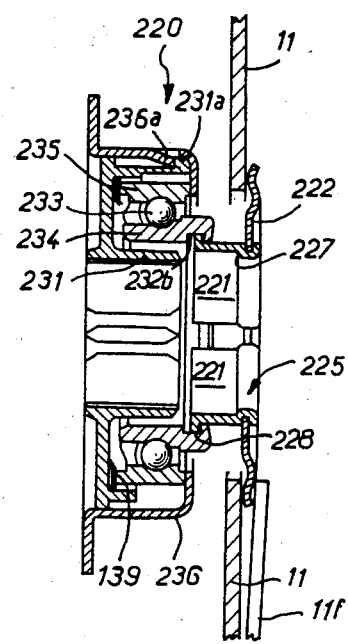

FRICTION CLUTCH

BACKGROUND OF THE INVENTION

1. Field of the Invention

The present invention concerns friction clutch cover assemblies, particularly suitable for automotive vehicles, comprising a diaphragm spring in said clutch cover assembly, a clutch release bearing in axial face-to-face relationship with said diaphragm spring, a central hole in said diaphragm spring, and a plurality of centripetal radial fingers around said central hole on which the release bearing is adapted to act in traction through the intermediary of a transverse annular flange disposed within said clutch cover assembly.

2. Description of the Prior Art

As is known, a diaphragm spring of the aforementioned kind is disposed, within a clutch cover assembly, between a cover and a pressure plate, with two annular contact areas of different diameter. It acts, in the so-called rest configuration, in the sense to increase the separation between the cover and the pressure plate. Following the disposition of a friction disk between said pressure plate and a reaction plate attached to the cover, this results in clamping of this friction disk to said reaction plate, which is generally driven by the crankshaft of a motor, so as to rotate therewith; this is the action of engaging the clutch. A release bearing is used to disengage the clutch by acting, in this case in traction, on the diaphragm spring so as to reduce and then eliminate the pressure applied by it to the pressure plate; no longer being clamped between the pressure plate and the reaction plate, the friction disk is no longer driven in rotation.

As is also known, clutch release bearings essentially comprise an operating member adapted to be acted on by a control member, commonly referred to as a yoke, and a drive member adapted to act on the fingers of a diaphragm spring; these components are coupled together in the axial direction by means of a ball bearing, but free to rotate. Conventional clutch release bearings currently divide into two major categories, according to whether they press on the fingers of a diaphragm spring ("push" type release bearings) or pull on same ("pull" type release bearings). In the former case, the release bearing is entirely outside the clutch cover assembly and it is axially positioned opposite the diaphragm spring during the very final stages of mounting the clutch, between the motor and the gearbox in an automotive vehicle, for example.

In the case of pull type release bearings, with which the present invention is concerned, the assembly operations prove more delicate since the operating member of the release bearing is outside the clutch cover assembly, whereas the drive member is partially inside the clutch cover assembly (transverse annular flange) and partially outside it (so that it may be coupled to the operating member), so that there is thus an axial part passing through the central hole in the diaphragm spring in order to join together these two parts. As a result of this, the operations of mounting the release bearing on the one hand and the clutch cover assembly on the other hand must be carried out in parallel, with the result that these parts cannot be transported and/or stored prior to their final mounting between motor and gearbox other than in a pre-assembly configuration. On the one hand, this entails a considerable storage space and on the other hand great caution must be exercised in handling in view of the high risk of damaging the delicate interface between these two parts.

An object of the present invention is to overcome these disadvantages and to provide for the separate assembling and delivery of each of the two parts. The invention is also directed towards a considerable simplification in the operations of assembling a pull type clutch release bearing and to substantially reducing the manufacturing costs thereof.

SUMMARY OF THE INVENTION

The invention consists in a friction clutch comprising a clutch cover assembly, a diaphragm spring in said clutch cover assembly, a clutch release bearing in axial face-to-face relationship with said diaphragm spring, a central hole in said diaphragm spring, a plurality of centripetal radial fingers around said central hole, and a transverse annular flange through which said clutch release bearing is adapted to act in traction on said radial fingers, wherein said radial fingers of said diaphragm spring are adapted to form a passage by means of which said transverse annular flange can pass through said diaphragm spring in a direction which is inclined relative to a median plane of said radial fingers of said diaphragm spring.

As a result, the assembly of the release bearing, and of the drive member in particular, no longer needs to be carried out from both sides of the diaphragm spring, and the operations involved in assembling the cover assembly and said clutch release bearing can be carried out independently of one another. In accordance with the invention, the aforementioned passage may be formed by cutting certain fingers and/or by elastic and-/or plastic deformation of said fingers. Those of the deformed fingers which the transverse annular flange has not passed beyond at the end of its passage through the aforementioned passage may be used with advantage to hold the release bearing against the diaphragm spring.

In accordance with the invention, a pull type release bearing may be assembled independently of the clutch cover assembly. To exploit this advantage, the invention further proposes to implement pull type release bearings by attaching a bush to the drive member of a push type release bearing to form an axial extension and transverse annular flange. This results in a significant reduction in manufacturing costs, since the release bearings are more highly standardized than in the prior art, the assembly of pull type release bearings differing from that of push type release bearings only in the final stages. The bush may be of unitary construction or otherwise, and its attachment to the drive member of a push type release bearing may be effected by crimping and/or snap-action, for example.

Other objects and advantages will appear from the following description of an example of the invention, when considered in connection with the accompanying drawings, and the novel features will be particularly pointed out in the appended claims.

BRIEF DESCRIPTION OF THE DRAWINGS

FIG. 5 is a view in cross-section of a first embodiment of clutch release bearing in accordance with the invention.

FIG. 6 is a view in cross-section of a second embodiment of clutch release bearing in accordance with the invention.

FIG. 7 is a view in cross-section of a third embodiment of clutch release bearing in accordance with the invention.

DESCRIPTION OF THE PREFERRED EMBODIMENTS

In the embodiments of the invention shown in FIGS. 1 to 4, a diaphragm spring 10 comprises a plurality of radial fingers 11 projecting centripetally from an outer ring (not shown) constituting a Belleville washer. The innermost end surfaces of these fingers define a circular hole of diameter $D_a$. It should be remembered that in the rest configuration a diaphragm spring is generally frustoconical in shape, similar to a Belleville washer, and that the flattened configuration shown in FIGS. 1 to 4, the so-called "new engaged" position, results from pre-stressing arising out of the fitting of the diaphragm spring into a clutch cover assembly and the fitting of said cover assembly to the reaction plate, after a friction disk with new friction facings is disposed between said reaction plate and the pressure plate of said cover assembly.

Figure 1:
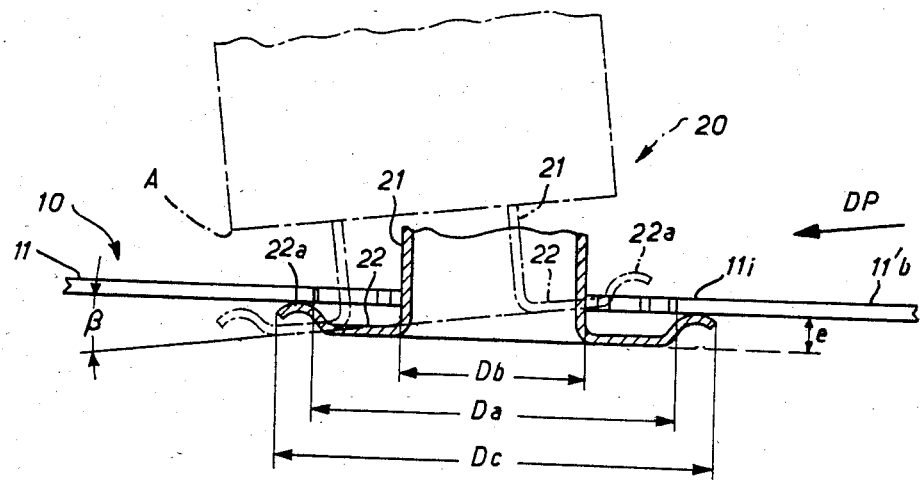
FIG. 1 is a view in cross-section on the line I—I in FIG. 2 of part of a diaphragm spring in accordance with the invention, schematically representing a release bearing in the process of being mounted.

The diaphragm springs shown in FIGS. 1 to 4 are designed to cooperate with pull type clutch release bearings. These release bearings, as schematically represented at 20 on FIGS. 1 to 4, have to this end an annular axial extension 21 which terminates at a transverse rim 22 delimiting with said extension and the remainder of the release bearing an annular groove open towards the outside and adapted to receive the inner ends 11i of the diaphragm spring fingers. The respective outside diameters of axial extension 21 and transverse rim 22 are $D_b$ and $D_c$. As can be seen in FIG. 1, transverse rim 22 has an axial projection 22a in the direction towards the body of the release bearing, intended to reduce to a narrow circular area its contact with the fingers of the diaphragm spring; the dimension of the axial projection is e. This dimension is equal to the thickness of the rim in the embodiment schematically represented in FIG 4.

As shown in FIGS. 1 and 2 or 3 and 4, a diaphragm spring in accordance with the invention embodies a modified version of the conventional axially symmetrical configuration, so as to provide a passage in a direction of penetration DP at a small angle $\beta$ to the median plane of the fingers, perpendicular to the axis of the diaphragm spring. This passage is designed to permit a pull type release bearing to pass through the diaphragm spring. To this end it has, perpendicularly to the aforementioned direction of penetration, a contour within which may be inscribed completely a diametral cross-section of transverse rim 22, also known as a transverse annular flange, in other words its dimensions are greater than those $D_c$ and e of said rim. Note that the passage intersects the axis of the diaphragm spring inside the clutch cover assembly in which it is mounted.

Figure 2:
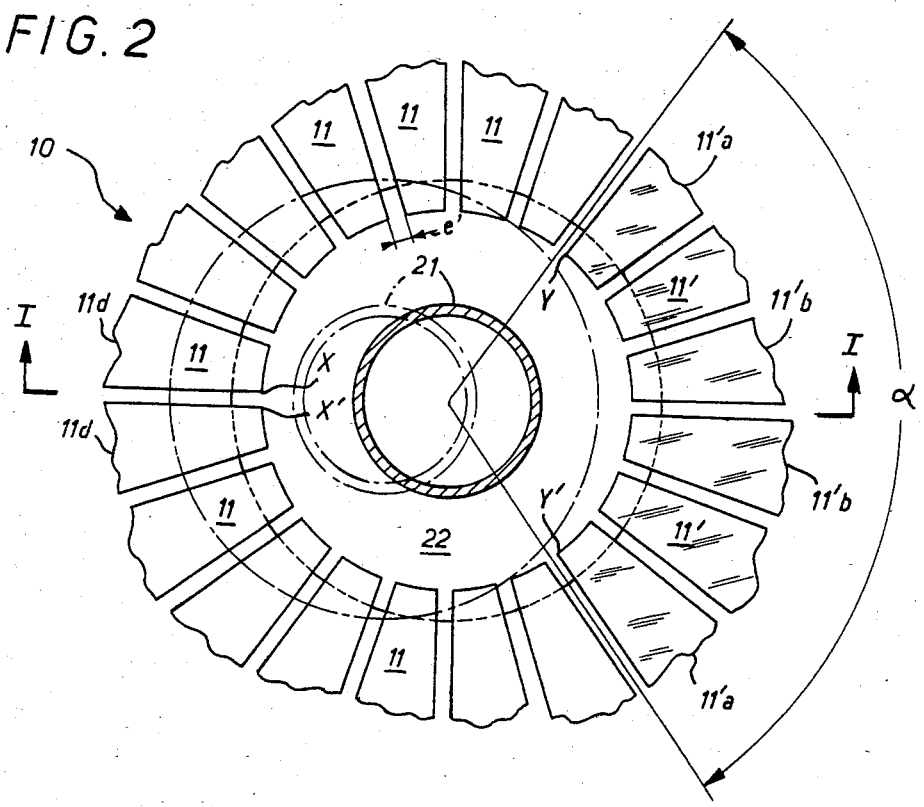
FIG. 2 is a plan view of the same diaphragm spring.

In the embodiment shown in FIGS. 1 and 2, the aforementioned passage is obtained by displacing towards the interior of the clutch cover assembly at least some of fingers 11' contained within a sector subtending an angle $\alpha$ and symmetrical relative to the plane defined by the direction of penetration and the axis of the diaphragm spring. According to the stiffness of the fingers of the diaphragm spring, necessary by virtue of the high loads which pass through them during clutch disengagement and engagement operations, the aforementioned displacement of at least some of the fingers may be obtained by simple elastic deformation of said fingers and/or previous plastic deformation in the axial direction; the latter results in a permanent angular deviation relative to their conventional orientation.

It will be readily understood that the deformation is maximal for the extreme fingers 11'a situated within the penetration sector and that it decreases in the direction away from the latter to become minimal for the finger or the two fingers 11'b which intersect or are disposed just to either side of the previously defined plane of symmetry of the sector.

For a gap with a width of e' at the ends of the specified fingers, there exists an optimal value of the inclination $\beta$ of the penetration passage for which the deformation of the extreme fingers is minimal, such minimal deformation varying inversely to e'.

It will also be readily understood that a high value of the inclination of the penetration passage requires deformation of only the extreme fingers, without deviation of the median fingers 11b, whereas a low value of $\beta$ requires a larger number of fingers to be deformed. In practice, the value $\beta$ is small, corresponding to an acute angle of a few degrees, in view of the various component parts located inside the cover assembly, especially in the case of a twin disk clutch, but nevertheless it is sufficient to deform a small number of fingers to constitute said penetration passage; the two extreme fingers and possibly two or four intermediate fingers; the elasticity of the fingers, in the case of permanent deformation, provides the remainder of the angular deviation which is necessary. However, for strict accordance with the invention, any number of fingers within the sector may be displaced.

Figure 3:
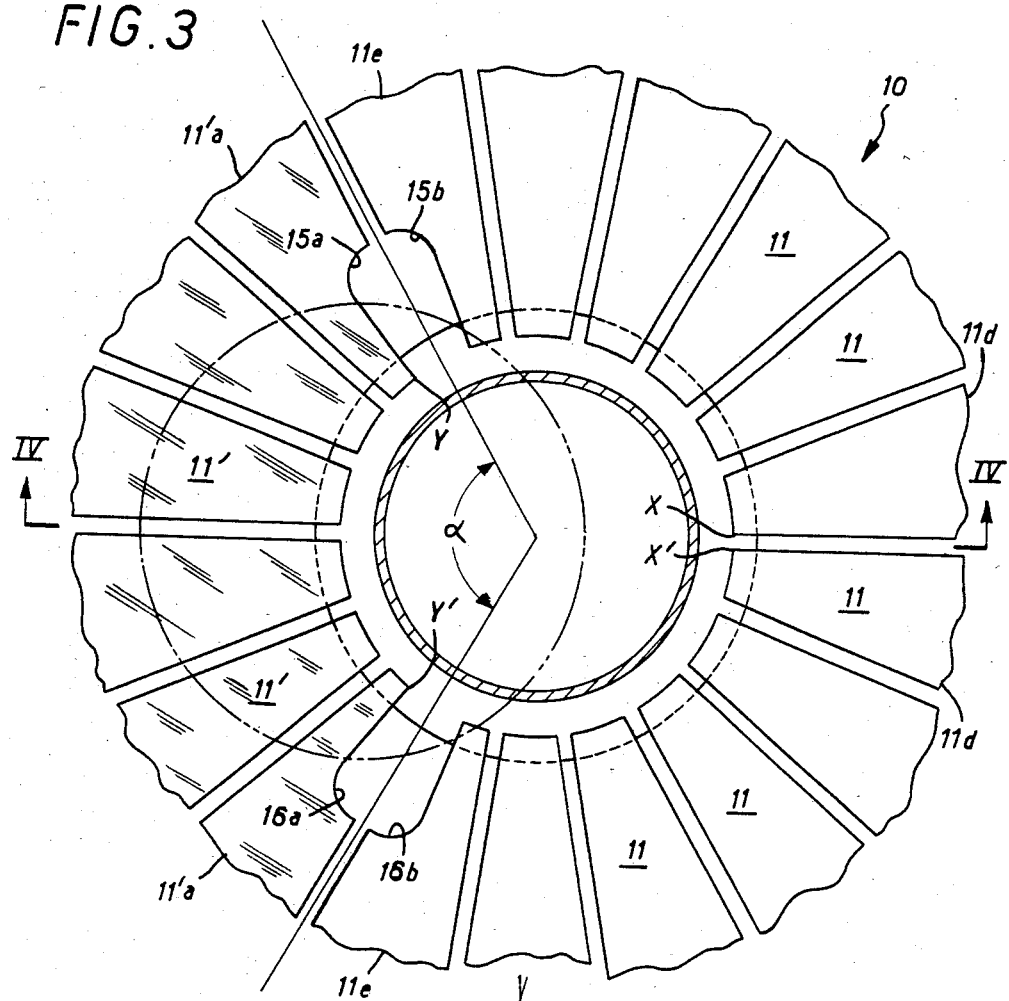
FIG. 3 is a plan view of a second embodiment of a diaphragm spring in accordance with the invention.
Figure 4:
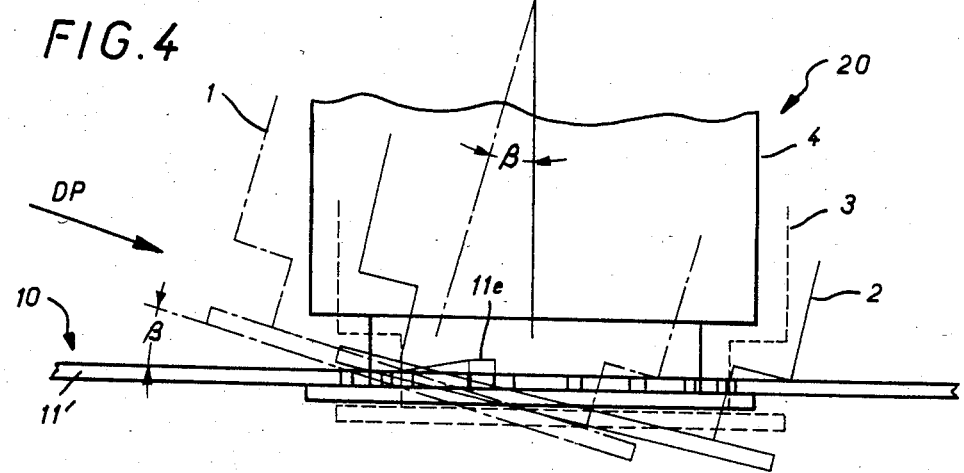
FIG. 4 is a view in cross-section on the line IV—IV through the diaphragm spring shown in FIG. 3.

The fitting of a pull type release bearing 20 into a diaphragm spring 10 formed with a penetration passage of this kind comprises the following stages, schematically represented in FIG. 4 and also deducible from FIGS. 1 to 3:

(1) the axis of the release bearing is tilted to an angle $\beta$ relative to the axis of the diaphragm spring, with transverse annular flange 22 disposed in line with the penetration passage; the aforementioned two axes are then coplanar with the penetration direction (see also chain-dotted lines in FIGS. 1 and 2);

(2) transverse annular flange 22 is moved in said passage in the penetration direction DP until contact occurs at X and X' between axial extension 21 of the release bearing and fingers 11d symmetrical with finger(s) 11'b;

(3) the release bearing is pivoted around its contact area with finger(s) 11d at XX' until its axis is again parallel with the axis of the diaphragm spring; in view of the elasticity of the fingers, the penetration passage narrows, preventing subsequent unwanted escape of transverse annular flange 22 from fingers 11 and the clutch;

(4) the release bearing is moved in translation in the direction opposite to the penetration direction until its axis is coincident with that of the diaphragm spring (release bearing shown in full line in FIGS. 1 and 2), using the friction disk centering tool, for example.

It is preferable to maintain the release bearing in this latter position; all that is needed for this is an intermediate part. As will emerge hereinafter, however, with reference to FIGS. 5 and 7, the release bearing may with advantage be maintained in the operative position by a few of the fingers, in particular extreme fingers 11'a.

Of course, the displacement of the transverse annular flange in the penetration passage in penetration direction DP does not necessarily have to continue until axial extension 21 of the release bearing comes into contact with fingers 11d. According to the space available, such displacement may be terminated before such contact, the release bearing then being realigned without contact with fingers 11d.

This kind of mounting procedure is possible only provided that certain dimensional conditions concerning the release bearing and the diaphragm spring are met.

Obviously: $D_b < D_a < D_c$.

Also: $\alpha < 180°$.

It is also necessary for the axial dimension of extension 21 to be sufficient for the latter to come into contact with fingers 11d of the diaphragm spring without the body of release bearing 20 previously coming into contact at A with the top surface of said fingers. Note that the longer axial extension 21, in other words the greater the axial distance between projection 22a and the release bearing, the greater may be the value of $\beta$.

Finally, it must be possible to realign the axis of the release bearing, that is to say, on contact at X, X' of fingers 11d with axial extension 21, the transverse annular flange must not cover points Y and Y' representing the leftmost edges in FIG. 2 of extreme fingers 11'a. Neglecting the inclination $\beta$, it is possible to show that, for a diameter $D_b$ fixed by the manufacturer, the following condition must be satisfied for realignment of the release bearing to be possible:

$$D_a > D_b + (D_c - D_b)/2$$

Given the typical dimensions of pull type clutch release bearings and the associated diaphragm springs, it is seen that it is advantageous to select a value for $\alpha$ between 100° and 150°, and more precisely a value of 120°.

It may be advantageous for practical reasons, as shown in FIG. 3, to form facing notches 15a, 15b, 16a and 16b in extreme fingers 11'a and 11e of the sector subtending angle $\alpha$ and its complement subtending an angle $2\pi - \alpha$, respectively. The presence of such notches, locally increasing the value e', provides for implementing a penetration passage for a release bearing with a small inclination $\beta$ of the direction of penetration without it being necessary to apply permanent displacement to extreme fingers 11'a. It must be borne in mind that the fingers transmit to the pressure plate of the clutch cover assembly the clutch release action applied to the drive member of the release bearing; the sharpness with which the friction disk is disengaged from the pressure plate is proportional to the number of active fingers. From what has been said hereinabove, it is seen that a low number of deformed fingers corresponds to a relatively high value of $\beta$. Now a "high" value is not always possible, due to the presence beneath the diaphragm spring of other parts of the clutch, whence the necessity for such notches in certain cases. The notches are disposed on the same side of a diameter of the diaphragm spring.

FIGS. 5, 6 and 7 show three embodiments of pull type release bearing in accordance with the invention. Allowing for the fact that, by virtue of the formation of penetration passages through the fingers of the diaphragm spring, a pull type release bearing 20 may be mounted on the diaphragm spring after assembly, the design of the aforementioned pull type release bearing is considerably simplified. It is sufficient to attach to the bearing of a conventional push type release bearing, of lower cost, a bush comprising an axial extension and a transverse rim forming a transverse annular flange. The manufacture of the release bearings then features increased standardization, since it is necessary to provide only bearings of the push type, the pull type release bearings no longer requiring a specific manufacturing line for the bearing, as in the prior art, only the order of assembly varying. This results in substantial cost reductions and increased productivity.

With reference to FIG. 5 (6 or 7), the pull type release bearing 20 (120 or 220) shown is obtained from the bearing 33 (133 or 233) of a push type release bearing and comprises in the conventional manner an operating member 31 (131 or 231) adapted to be acted on by a control member such as a yoke and a drive member 32 (132 or 232) which is coupled to it in the axial direction but free to rotate, by virtue of said ball bearing 33 (133 or 233), the inner ring 34 (134 or 234) of which forms part of drive member 32 while the outer ring 35 (135 or 235) is axially coupled to the remainder of operating member 31 (131 or 231) by means of a cap 36 (136 or 236). As these conventional release bearings 30 do not form part of the present invention, they will not be described in detail here.

In the embodiment shown in FIG. 5, a bush 25 of unitary construction constitutes simultaneously the axial extension 21 and the transverse rim 22; it is attached to drive member 32 by crimping to the internal surface of the latter, by virtue of flaring along the length of a frustoconical section 37 which interconnects with drive ring 34. Axial extension 21 has a radial annular fold 26 which is outwardly directed and against which bears driving edge 32a of drive member 32. As in FIG. 1, rim 22 has an axial projection 22a adapted to bear on fingers 11 of the diaphragm spring.

In the embodiment of FIG. 5, release bearing 20 is maintained in position relative to diaphragm spring 10 by gripping of axial projection 22a of rim 22 between those fingers 11 which are not deformed or forced back into their normal configuration and at least two fingers 11f beyond which transverse annular flange 22 does not pass on mounting of the release bearing on the diaphragm spring to prevent any rotation of the release bearing relative to the diaphragm spring. These fingers are with advantage extreme fingers 11'a which, as stated hereinabove, are those corresponding to the maximum deformation. It may also be advantageous to deform one of fingers 11d so that rim 22 is gripped by the fingers of the diaphragm spring in three areas which are substantially equidistantly spaced along annular axial projection 22a. This equidistant relationship is optimal when the value of $\alpha$ is 120°.

It will be understood that the aforementioned fingers 11f beyond which transverse annular flange 22 does not pass may be selected differently from fingers 11a and 11d without departing from the scope of the invention;

there may be any number of such fingers, and they are with advantage equi-angularly spaced. Since these fingers do not contribute to the transmission of clutch release forces, it is preferable for their number to be small.

Bush 25 is shown in FIG. 5 as a part stamped out from sheet metal. While this offers advantages with regard to simplicity of manufacture, it is not mandatory, of course.

FIG. 6 shows a pull type release bearing 120 derived from a push type release bearing whose operating member 131 comprises, on the one hand a sleeve 131a attached to which is a transverse flange 131b adapted to provide axial support for the outer ring 135 of the bearing 133, and on the other hand a part 138, hereinafter referred to for convenience as the support part, which has an axial bush 138a and radial flanges 138b and 138c at respective ends of the bush. In this embodiment, the bush is held with its flange 138b against flange 131b by cap 136, which is annularly crimped to the combination of flange 131b and flange 138b. In practice, sleeve 131a and flange 131b are of a synthetic material and support part 138 is of metal. In the case of a push type release bearing, flange 138b is adapted to be acted on by a control member. Note that in the case of a self-centering release bearing in which the self-centering action is maintained, a corrugated elastic washer 139 is disposed axially between flange 131b and ring 135. A bush 125 closely similar to bush 25 in FIG. 5 is crimped to drive member 132 of release bearing 120.

The maintaining in position of bush 125, and thus of the complete release bearing 120, on fingers 11 of diaphragm spring 10 is here achieved by means of an intermediate centering and transverse support flange 40, clamped at its inner periphery between drive edge 132a and fold 126 of bush 125. Flange 40 comprises, in the vicinity of its outer periphery, an annular notch 41 adapted to support a toroidal elastic member 50. As shown in FIG. 6, elastic member 50 has, when seen in cross-section, the shape of a circumflex accent. As a result, the area in which it contacts fingers 11 does not feature any sharp edge, which facilitates the fitting of the diaphragm spring by avoiding snagging of its edge. It will be appreciated that it is only necessary to attach to this conventional push type release bearing the bush 125 and the flange 40 to obtain a pull type release bearing. In this case, it is flange 138c which is adapted to be acted on by control member 140, as show in FIG. 6.

FIG. 7 shows an embodiment of the bush which is not of unitary construction. In this instance, the bush 225 consists of a support flange 222 and a split tube 221 with a lip 228, while the drive member has a centripetal groove 232b whose profile is complementary to that of edge 228. The tube has in the vicinity of the edge opposite lip 228 a transverse recess 227 which reduces its outside diameter to a value equal to the diameter of the central hole in flange 222.

A first stage in the assembly of the bush consists in the elastic fitting of tube 221 and lip 228 into groove 232b in the drive member. As a second stage, flange 222 is engaged around the edge of tube 221 until it butts up against recess 227. This edge is then crimped to the outside periphery of flange 222, so rigidifying the bush assembly.

The bush is maintained in position on the fingers of the diaphragm spring in the manner described with reference to FIG. 5.

Although the embodiments of push type release bearing shown in FIGS. 5 to 7 are conventional as a whole, the invention also proposes to attach cap 236 to operating member 231 by means of impressed tangs 236a designed to apply a discontinuous peripheral projection 231a of said member axially against the transverse rim which said cap incorporates for the purpose of retaining in position the outer ring of bearing 233. This attachment method naturally has wider applications.

It will be understood that the embodiments of a diaphragm spring and release bearing of a clutch in accordance with the invention shown in FIGS. 1 to 7 have been described by way of example only and that numerous further embodiments, whether or not representing combinations of the above embodiments, may be conceived by those skilled in the art without departing from the scope of the invention. For example, at least some of the fingers may have their innermost ends disposed on one or more circumferential lines of different diameter and on different centers than those of the other fingers. In this way realignment of the release bearing may be rendered possible in spite of the value of diameter $D_a$.

Thus it is possible to avoid the transverse annular flange covering points YY' on contact at XX' of fingers 11d with axial extension 21 for the purpose of its realignment, by using the aforementioned characteristic.

For example, this may be achieved by disposing the inner ends of the fingers in the sector subtending angle $\alpha$ on a circumferential line of diameter $D_r$ which, allowing for realignment of the release bearing, is greater than $D_b + (D_c - D_b)/2$, the center of which is situated on the line bisecting angle $\alpha$ and offset by a distance $(D_r - D_a)/2$ in the direction towards fingers 11d relative to the center of the circular hole of diameter $D_a$ of the ordinary fingers not within sector $\alpha$.

Note that this arrangement results in the removal of material from the fingers in sector $\alpha$, the amount removed being greater for the extreme fingers 11'a and minimal or even zero for fingers 11'b.

It will be further understood that, instead of being produced only by displacement of certain fingers towards the interior of the clutch cover assembly, the penetration passage through the diaphragm spring for the transverse annular flange may also be obtained by raising all or part of the plastically deformed fingers which may result, in the case of a combination of these two types of plastic deformation, in maximal deformations which are much less than in the cases described by way of example. Also, a penetration passage in accordance with the invention may be obtained by simply cutting out notches, without permanent deformation of any finger, each notch affecting any number of fingers.

Note also that, while in FIG. 1 the diaphragm spring is in a flattened or so-called "new engaged" configuration, the release bearing being mounted after mounting of the cover assembly on the reaction plate, it is possible to mount said release bearing on the cover assembly before mounting the latter on the reaction plate, the cover assembly then being it its so-called storage position and the diaphragm spring then having a frustoconical configuration. This is the reason for which the expression "median plane of the fingers" is used hereinabove to designate the plane perpendicular to the axis of the diaphragm spring passing through the edge of the inner ends of the fingers and delimiting the aforementioned frustoconical portion.

We claim:

1. A diaphragm clutch and release bearing assembly comprising a clutch cover unit including a diaphragm spring having a plurality of centripetal radial fingers separated by slots, and a central hole radially inwardly of said fingers, and a pull-type release bearing comprising a bearing member disposed on an axially outer side of said diaphragm spring, an axial extension on said bearing member extending axially through said central hole of said diaphragm spring, a transverse annular flange extending radially outwardly from said axial extension and being axially spaced from said bearing member, said transverse flange having an outer diameter greater than the diameter of said central hole, said transverse flange axially bearing against an axially inner side of said diaphragm spring for applying traction to said diaphragm spring for controlling the operation of the clutch, selected radial fingers of said diaphragm spring defining means for passing said transverse flange through said central hole from said axially outer side to said axially inner side with said transverse flange being transverse to an axial axis of said assembly and at an acute angle to the general plane of said diaphragm spring.

2. An assembly according to claim 1, wherein said means for passing said flange through said central hole comprises notches in said selected radial fingers communicating with associated ones of said slots, said notches being angularly spaced from each other at an angle substantially less than 180°.

3. An assembly according to claim 1, wherein said means for passing said flange through said central hole comprises radially inner portions of said selected radial fingers being temporarily deformable axially relative to one another.

4. An assembly according to claim 1, wherein said means for passing said flange through said central hole comprises said selected radial fingers being permanently axially offset relative to the nonselected radial fingers.

5. An assembly according to claim 4, wherein said selected radial fingers are deformed towards the interior of said clutch cover assembly and are contained within a sector subtending an angle of between 100° and 150°.

6. An assembly according to claim 5, wherein said subtended angle is about 120°.

7. An assembly according to claim 1, wherein said transverse annular flange is clamped between said selected fingers and nonselected fingers of said diaphragm spring.

8. An assembly according to claim 7, wherein said selected radial fingers of said diaphragm spring are, at least in part, permanently deformed to define said means for passing said transverse flange through said central hole.

9. A clutch according to claim 1, wherein radially innermost ends of said selected radial fingers of said diaphragm spring lie on a first circumference axially spaced from a second circumference on which lie radially innermost ends of the nonselected radial fingers.

10. An assembly according to claim 1, wherein said bearing member comprises a bearing of the kind used in a push-type release bearing and which has inner and outer races, and said axial extension comprises a bush and extends from one of said races.

11. An assembly according to claim 10, wherein said bush and said transverse member flange are of unitary construction.

12. An assembly according to claim 11, wherein said bush is a sheet metal stamping.

13. An assembly according to claim 12, wherein said bush is crimped to the inside of the inner bearing race and said axial extension includes a frustoconical flared portion and a radial annular fold for crimping said bush on said inner bearing race.

14. An assembly according to claim 13, wherein said clutch release bearing further comprises a toroidal elastic member for urging said radial fingers of said diaphragm spring towards said transverse annular flange and a transverse centering and supporting flange which is clamped between said outer bearing race and said annular fold, and said transverse centering and supporting flange has an annular recess for accommodating said annular elastic member.

15. An assembly according to claim 14, wherein said annular elastic member has the generally V-shaped cross-section with one leg engaging said annular recess.

16. An assembly according to claim 10, wherein said one race has an annular groove and said bush comprises a split tube and a support flange, and said split tube has an axially inner end with a radial recess which receives in crimping relation the internal periphery of said transverse annular flange.

* * * * *